Oct. 21, 1930.  T. W. LOWE  1,779,098
FUSIBLE PLUG DEVICE
Filed Oct. 13, 1928  2 Sheets-Sheet 1

INVENTOR
T. W. Lowe
BY
Albert E. Dieterich
ATTORNEY

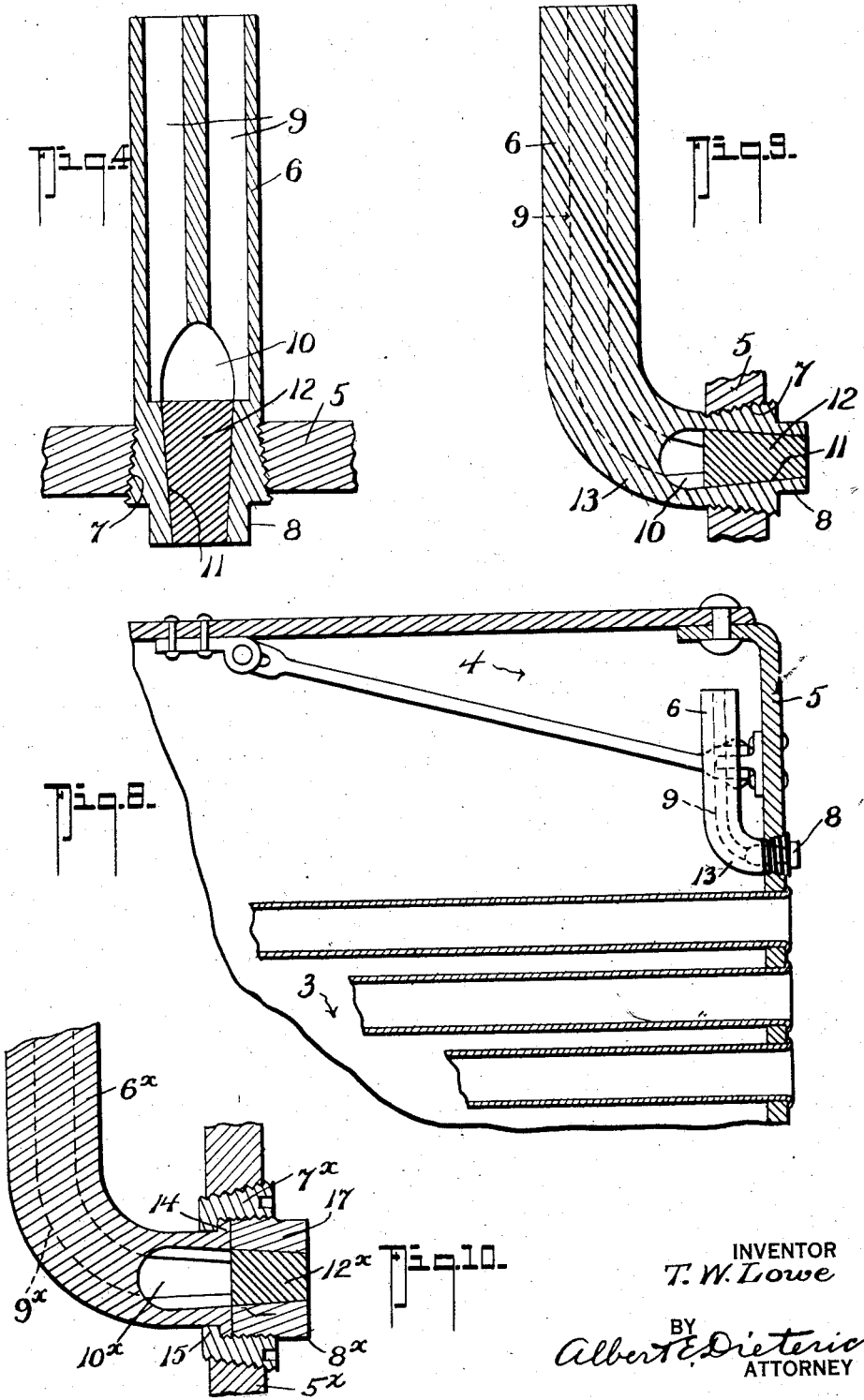

Patented Oct. 21, 1930

1,779,098

UNITED STATES PATENT OFFICE

THOMAS WILLIAM LOWE, OF WINNIPEG, MANITOBA, CANADA

FUSIBLE PLUG DEVICE

Application filed October 13, 1928. Serial No. 312,285.

My invention relates to certain new and useful improvements in devices to protect boilers against damage due to low water and to prevent violent explosions which frequently occur when a boiler is operated with an insufficient supply of water.

Heretofore it has been the practice to use low water alarms of various designs, none of which, so far as I am aware, will put water into the boiler, or quench the fire and as a result they are not satisfactory. Another device is the ordinary fusible plug which has not satisfactorily supplied what the mechanics of the United States and Canada require; therefore, these fusible plugs have not been made compulsory for use by law nor have they been exclusively voluntarily used. The reasons for this are that the precipitation of scale and foreign matter in the water during service adheres to the end of the plug where it projects into the water in the boiler. The scale then resists the boiler pressure to force the steam and water to escape, even though the fusible metal has melted out of the plug, thus rendering the device inoperative for its intended purpose. Again, frequent occurrences have been noted when the fusible metal had melted out of the plug for some time and the scale which had gathered later became sludge, and blew out, due to changed water conditions, resulting in the inconvenience occasioned from a boiler failure. Further, because of scale formation adhering to the projecting plug in the water and consequent melting out of the fused metal frequent renewal of the fusible metal was advocated without good results.

My invention therefore primarily has for its object to provide a fusible plug device free from the aforesaid objections, the fusible plug of which will fuse and quench the fire automatically, only when water falls below the highest part of the boiler or fire box that is subject to the products of combustion.

In its generic nature the invention includes means to exclude absolutely the formation of scale over the fusible metal by providing a chamber for the circulation of distilled water and steam in order to protect the fusible plug against being in contact with the impure water which may be in the boiler.

More specifically, the invention provides means whereby the device automatically provides its own pure water by distillation (condensation) so as to maintain pure water and steam in the device, thereby preventing blocking the outlet with accumulations of sediment and scale, and also avoiding the necessity of renewing the fusible metal unless the boiler has become short of water.

Other objects will in part be obvious and in part be pointed out hereinafter.

To the attainment of the aforesaid objects and ends the invention includes those novel features of construction, combination and arrangement of parts which will hereinafter be fully described and then be specifically pointed out in the appended claims, reference being had to the accompanying drawings, in which:

Figure 4 is a vertical section on the line 4—4 of Figure 3.

Figure 8 is a detail fragmentary section of a return pipe boiler with my invention in modified form applied.

Figure 9 is an enlarged vertical longitudinal section of the device shown in Figure 8.

Figure 10 is a section of another modification of my invention.

Figure 1:
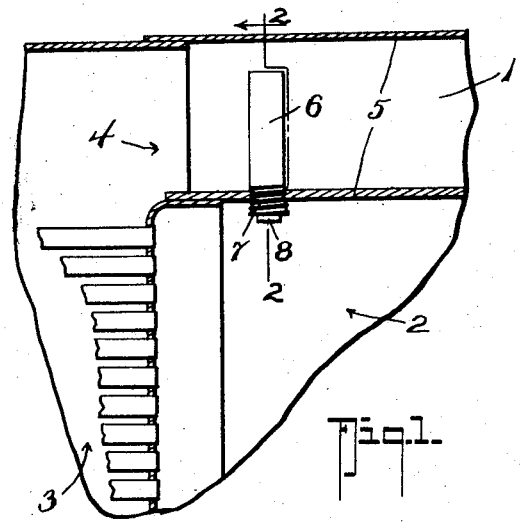
Figure 1 is a fragmentary vertical longitudinal section showing my invention applied to a crown sheet of a "locomotive type" boiler.

In the drawings, in which like numerals of reference indicate like parts in all of the figures, 1 represents the boiler having the usual firebox 2, water space 3 and steam space 4. The boiler, of course may be of any type as my invention is adaptable to use on any type of boiler having a steam space and a water space through which my device can be projected from the firebox.

Figure 5:
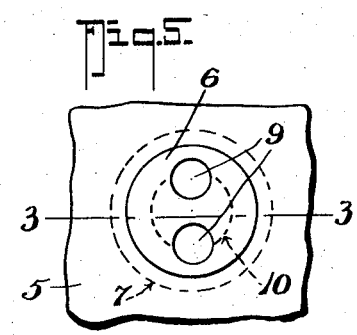
Figure 5 is a top end view of the device.
Figure 2:
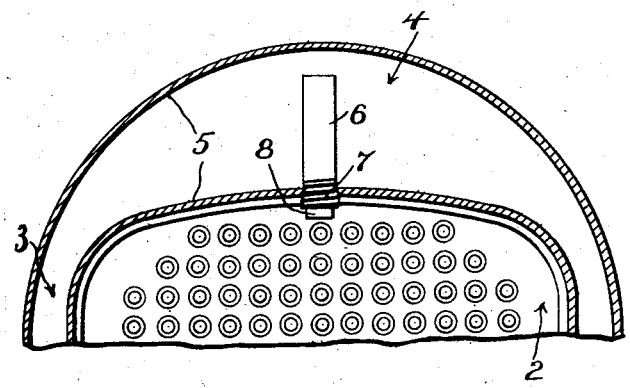
Figure 2 is a cross section on the line 2—2 of Figure 1.
Figure 3:
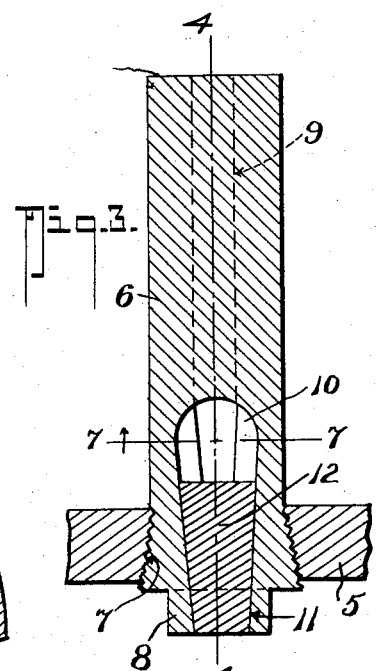
Figure 3 is an enlarged vertical section of the invention, a fragment of a crown sheet being shown.
Figure 7:
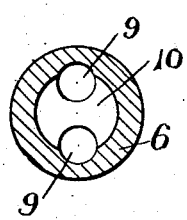
Figure 7 is a cross section on the line 7—7 of Figure 3.
Figure 6:
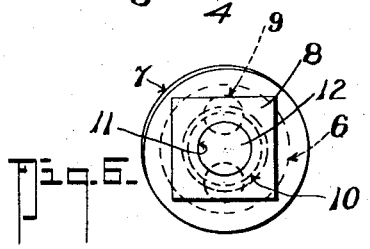
Figure 6 is a bottom end view of the device.

The specific embodiment illustrated in Figures 3 to 7 inclusive, comprises an elongated body 6 preferably of cylindrical form, and having adjacent its lower end an external thread 7 preferably tapered so as to screw into the crown sheet or head sheet 5 of the boiler.

The lower end of the body has an angled portion (square, hexagon or other similar form) 8 on which a wrench may be placed for the purpose of screwing the device into the crown sheet. The portion 8 will hereinafter be referred to as the nut portion.

Extending inwardly from the upper end of the body 6 is a pair of ducts or passages 9—9 that communicate with a chamber portion 10 located adjacent to the crown sheet end of the device, the chamber portion 10 merging with the outlet duct or passage 11 that opens through the lower end of the body 6 as shown. This passage 11 is normally closed, however, by a fusible plug 12 of the usual material employed in fusible plug devices, or any other suitable material for the purpose.

Where the device is to be used on return tubular boilers (see Figures 8 and 9) the tubular body 6 is laterally bent adjacent its lower end as at 13 so that the outlet passage 11 may lie horizontally instead of vertically and enable the device to be screwed into a vertical wall instead of into a horizontal wall of the boiler. Where difficulty may be encountered in placing the devices because of the position of the tubes the modification illustrated in Figure 10 may be employed and by reference to this figure it will be seen that the elongated body 6ˣ is provided with a flange 14 to fit against the shoulder 15 of the outer part 7ˣ of the two-part plug so that the elongated body 6ˣ may have a swivel connection with the plug portion 7ˣ, it being secured against swivelling after placement by a jam plug 17 threaded into the plug part 7ˣ, the plug part 17 having the nut portion 8ˣ and carrying the fusible material 12ˣ. The chamber 10ˣ and ducts 9ˣ are provided, as above, and correspond in purpose and function to the chambers 10 and 9 respectively in the preceding embodiments of the invention, the vertical wall of the boiler into which the device is secured being designated by 5ˣ.

It will be observed from the foregoing that in all applications of my invention the upper end of the elongated body lies above the water line or water space of the boiler and is at all times in communication with the steam space so that the passages 9 and chamber 10 may be filled with steam and water when the boiler is carrying steam and with pure water of condensation when the boiler shuts down. Thus at no time does the dirty water of the boiler get into the chamber 10 and/or ducts 9ˣ.

Further it will be seen that as soon as the boiler which has been shut down starts up again the condensed water within the chamber 10 will take on the temperature of the outside water within the water space and boiler, thus generating steam and assist in keeping the passages 9 free from any possible obstruction.

As will be seen, the primary novel feature of this invention is that it automatically ensures the manufacture of its own pure water (by distillation) and this pure water and steam are used to prevent scale formation that would tend to obstruct the passages and thus avoid the necessity of renewing the fusible metal unless the boiler has become short of water and the metal has fused in consequence thereof.

A further novel feature of the invention is that the fusible metal is not only in contact with the impinging gases of the products of combustion at one end, but its opposite end is not in contact with the impure water of the boiler, such as obtains with other devices of this general kind. Again the pure water and steam circulating chamber of my invention not only excludes the impure water of the boiler from the water end of the fusible metal but in doing so provides a better circulating method for the protection of the fusible metal when in service.

When water becomes low in a boiler and the plates and other parts of it are exposed to the products of combustion they gradually and quickly increase in temperature above that of the steam and water then in the boiler until they become so ductile as to yield to pressure in the boiler and destruction of the boiler follows.

With my invention the fusible metal is arranged to melt at a temperature lower than the danger point of separation, and sufficiently low to prevent injury to the boiler or loss of life due to its destruction.

From the foregoing description, taken in connection with the accompanying drawings, it is thought the construction, operation and advantages of my invention will be clear to those skilled in the art and further I desire it understood that slight changes in the details of construction, combination and arrangement of parts may be made without departing from the spirit of the invention or the scope of the appended claims.

What I claim is:

1. In boilers, a fusible plug device comprising a fitting including a body in part located in the steam space of the boiler and having a water and steam chamber, and in part located in the firebox of the boiler, and a fusible plug in said body, one end of which plug is in register with said chamber and the other end is exposed to the products of combustion in the firebox, that portion of the body part that is located within the steam space of the boiler terminating short of the top of the boiler.

2. In boilers, a fusible plug device comprising a fitting provided with a passage through the same closed at one end by a fusible plug and having a water and steam chamber between the plug and the end of the device within the steam space of the boiler to exclude the impure water of the boiler from the plugged passage and fusible plug, said fusible plug device being wholly located within the boiler.

3. In boilers, a fusible plug device having a passage closed at one end by a fusible plug, the open end of said passage communicating with the steam space of the boiler and the closed end communicating with the firebox whereby the fusible plug will have one of its ends protected by pure water and steam and its other end exposed to the products of combustion, said fusible plug device being wholly located within the boiler.

4. A fusible plug device comprising an elongated body having a pair of ducts extending from one end inwardly and having a chamber with which said ducts communicate, said body having an outlet passage from said chamber through the other end of the body and a fusible plug normally closing said outlet passage.

5. A fusible plug device comprising an elongated body having a pair of ducts extending from one end inwardly and having a chamber with which said ducts communicate, said body having an outlet passage from said chamber through the other end of the body, a fusible plug normally closing said outlet passage, and means adjacent the outlet end of said body for mounting said body in the boiler.

6. In combination with a boiler having a water space and a steam space, a firebox and a wall between the firebox and the steam and water spaces; a fusible plug device comprising an elongated body one end of which is provided with means to mount it in said wall in position to hold the other end of said body in the steam space of the boiler, a part of said body being within the water space of the boiler, said body having a passage through the same from end to end, that portion of said passage which lies adjacent the mounted end of the body being closed by a fusible plug, said plug being exposed in part to the products of combustion in the firebox, said fusible plug device being wholly located within the boiler.

7. In combination with a boiler having a water space and a steam space, a firebox and a wall between the firebox and the steam and water spaces; a fusible plug device comprising an elongated body one end of which is provided with means to mount it in said wall in position to hold the other end of said body in the steam space of the boiler, a part of said body being within the water space of the boiler, said body having a passage through the same from end to end, that portion of said passage which lies adjacent the mounted end of the body being closed by a fusible plug, said plug being exposed in part to the products of combustion in the firebox, said passage also including an enlargement constituting a chamber adjacent the inner end of the plug whereby water of condensation and steam will protect said plug against fusion while the boiler is functioning properly, said fusible plug device being wholly located within the boiler.

8. In combination with a boiler having a firebox and steam and water spaces separated from the firebox by a wall, a fusible plug device comprising an elongated body mounted in the wall and projecting through the water space of the boiler into the steam space, said elongated body having a passage through the same to effect communication between the steam space and the firebox at times, a fusible plug normally closing said passage, one end of said fusible plug being in communication with the products of combustion in the firebox and the other end in communication with the steam in the boiler, said fusible plug device being wholly located within the boiler, all being substantially as shown and described.

9. In combination with a boiler, a fusible plug device comprising a fitting arranged to lie in part in the water space and in part in the steam space of a boiler and communicate at one end with the firebox of the boiler, a fusible plug in said fitting and having one end subject to the products of combustion in the firebox, and means to protect the other end of said plug from dirty water in the boiler while maintaining said other end in communication with the steam space of the boiler, said fusible plug device being wholly located within the boiler.

10. In combination with a boiler, a fusible plug device comprising a fitting arranged to lie in part in the water space and in part in the steam space of a boiler and communicate at one end with the firebox of the boiler, a fusible plug in said fitting and having one end subject to the products of combustion in the firebox, and means to maintain distilled water and steam in contact with said other end of the plug, said fusible plug device being wholly located within the boiler.

THOMAS WILLIAM LOWE.